April 7, 1970  H. A. PETERSON  3,505,567
SINGLE PHASE RECLOSING OF CIRCUIT BREAKER IN MULTIPHASE
ELECTRICAL TRANSMISSION SYSTEMS
Filed Oct. 18, 1967

Inventor
Harold A. Peterson
By Thomas F. Kirby
Attorneys

United States Patent Office 3,505,567
Patented Apr. 7, 1970

3,505,567
SINGLE PHASE RECLOSING OF CIRCUIT BREAKER IN MULTIPHASE ELECTRICAL TRANSMISSION SYSTEMS
Harold A. Peterson, Madison, Wis., assignor to Allis-Chalmers Manufacturing Company, Milwaukee, Wis.
Filed Oct. 18, 1967, Ser. No. 676,338
Int. Cl. H02h 3/26
U.S. Cl. 317—22     3 Claims

ABSTRACT OF THE DISCLOSURE

Separate capacitors of predetermined value are placed in parallel with each of the circuit interrupters in each of the phase lines of a three phase electrical transmission system. During a fault condition, only that phase line which is faulted opens and recloses. In the case of all three phase lines being faulted, all capacitors are disconnected from across the circuit interrupters before the circuit interrupters open simultaneously.

SUMMARY OF THE INVENTION

This invention relates to means and methods for effecting single phase reclosing of circuit breakers in multiphase electrical transmission systems.

In three phase electrical power systems, it is often desirable to resort to automatic high speed opening and reclosing of circuit breakers at both ends of a transmission line after a fault has occurred and been cleared just prior to reclosing. In general, high speed reclosing operation is such as to permit heavier loading without encroaching upon a desired margin of safety short of the transient stability limit of a given system. This theory is well known and many examples of its embodiment can be found in modern power systems. With few exceptions, those systems employing automatic reclosing are three phase reclosing schemes. Only a few are single phase in spite of the fact that there are additional benefits to be gained by going to single phase switching and reclosing. United States Patent 3,083,277 issued Mar. 26, 1963 to Tsutsui et al. for "Phase Absence Protective Device for Polyphase Circuit Breakers" discloses a multiphase circuit breaker wherein a single phase can be opened and reclosed. One of the reasons which favors three phase reclosing is that the relaying is simple. The additional benefits of single phase reclosing are realized at the cost of increased relaying complexity. Furthermore, all is not gain in going to single phase reclosing because, in general, it takes longer for a faulted phase to clear in the case of single phase switching than it does for a fault to clear in the case of three phase switching. The reason for this lies in the presence of capacity coupling between phases. This coupling causes the arc to persist and it becomes necessary for the arc to clear itself subject to a recovery voltage of about 0.15 to 0.20 p.u. of normal system voltage. While such clearing is assured in most practical cases, more "open" or "dead" time is required for this as compared to the three phase case. The shorter "dead" time required is a help in improving the transient stability of a given system.

OBJECTS OF THE INVENTION

It is an object of the present invention to provide a simple means and method for nullifying the aforesaid capacity coupling between phases and thus make it unnecessary to require a longer dead time for single phase reclosing than for three phase reclosing, thereby realizing more fully the benefits of single phase reclosing in improving transient stability limits of power systems.

Another more specific object is to provide a multiphase system having a separate circuit interrupter in each phase line, having a separate capacitor of predetermined value in circuit with each circuit interrupter, having means whereby each circuit interrupter operates to open and reclose in response to a fault in its respective phase line, and having means for disconnecting said capacitors before opening and reclosing of said circuit breakers when a fault simultaneously occurs on all three phases.

Other objects and advantages of the invention will hereinafter appear.

DRAWING

The accompanying drawing illustrates a preferred embodiment of the invention but it is to be understood that the embodiment illustrated is susceptible of modification with respect to details thereof.

DESCRIPTION OF THE INVENTION

Figure 1:
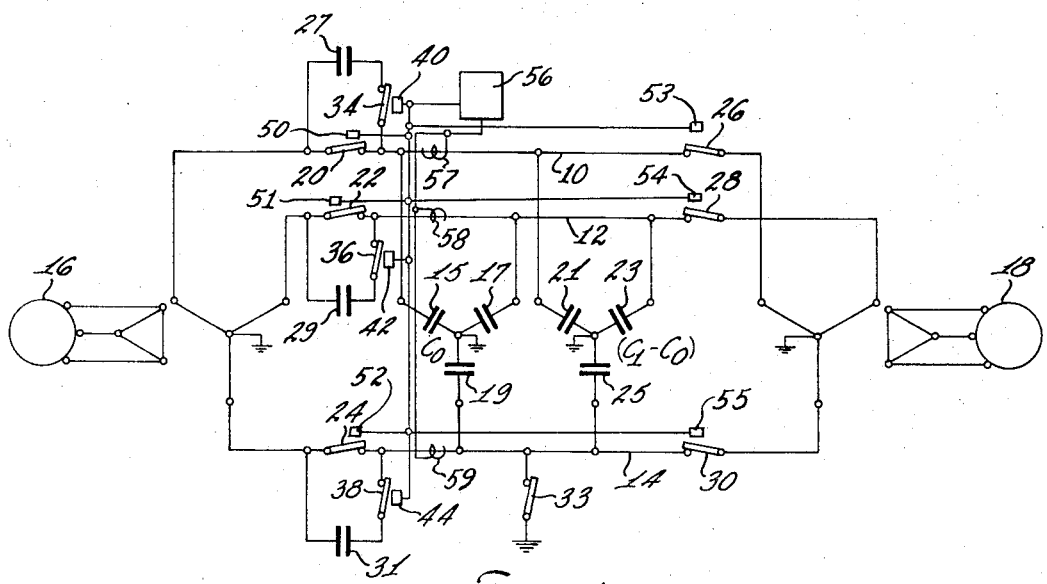
FIG. 1 is a schematic diagram of a three phase electrical transmission system in accordance with the present invention.

Referring to FIG. 1, there is shown a simplified schematic diagram of a three phase electrical transmission system in accordance with the present invention. The system comprises three phase lines 10, 12 and 14 which are connected between ideal terminals or power supply sources 16 and 18. It is desired to maintain synchronism between the two terminals 16 and 18 while faults occur on any or all of the lines 10, 12 and 14.

Two sets of three capacitors each, namely, capacitors 15, 17, 19 and 21, 23, 25, are shown to indicate the natural lumped capacitances of the transmission lines 10, 12 and 14, respectively. These capacitances are lumped together so that the capacitances of capacitors 15, 17, 19 are designated capacitance $C_0$ and that of capacitors 21, 23, 25 are designated capacitance $(C_1 - C_0)$. For purposes of discussion the lumped capacitances involved are defined as follows. Each capacitor 15, 17 and 19 is intended to represent the zero sequence capacitance of the particular phase line with which it is associated, i.e., that capacitance which would exist between the phase line and ground if the voltages on each phase line are assumed to be equal and not out of phase. Each capacitor 21, 23 and 25 is intended to represent the capacitance of the particular phase line with which it is associated, which capacitance is the difference between the positive sequence capacitance and the zero sequence capacitance. Positive sequence capacitance is that capacitance between each phase line and ground when each phase line hits its peak voltage in its proper phase sequence.

The system further comprises one set of suitable circuit interrupters or breakers 20, 22 and 24 in the lines 10, 12 and 14, respectively, near one end thereof and also comprises another set of suitable circuit interrupters or breakers 26, 28 and 30 in the lines 10, 12 and 14, respectively, near the other end thereof. For discussion purposes all the circuit interrupters are shown in closed position. The breakers 20, 22, 24 and 26, 28, 30 are provided with suitable relay means 50, 51, 52 and 53, 54, 55, respectively, to effect opening and closing of the circuit breakers in response to line conditions, as hereinafter explained. The relay means 50, 51, 52 and 53, 54, 55 are connected to suitable master relay means 56 which has current transformers 57, 58 and 59 associated with the lines 10, 12 and 14, respectively. In accordance with the present invention, capacitors 27, 29 and 31 are connected in circuit with (i.e., across or in parallel with) the circuit interrupters 20, 22, 24, respectively. These capacitors have a predetermined value as hereinafter explained.

If all three phase lines 10, 12 and 14 are opened at both ends by opening of the breakers 20, 22, 24 and 26, 28, 30, respectively, after a fault occurs, there is nothing to sustain the fault and the ionized path of the fault quickly heals itself. Upon reclosure of the breakers at both ends, the system is restored to its original condition. If this can be done before the two machines have swung apart excessively, then synchronism is retained.

In the case of a single line to ground fault, it would be preferable to switch only the phase which is faulted instead of switching all three phases. Assume that prior to the occurrence of such a single line to ground fault, all breakers 20, 22, 24 and 26, 28, 30 are closed and power is being transmitted. When, for example, a ground fault occurs on phase 14, represented by closure of a grounding switch at 33, it is desired to open only phase line 14 at both ends by opening switches 24 and 30 and suitable means are provided to accomplish this. Of course, breakers 20, 22 and 26, 28 remain closed.

Figure 2:
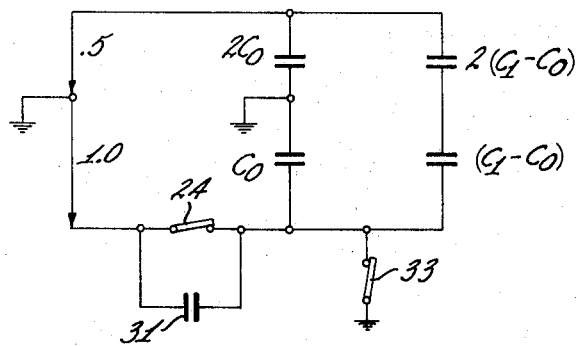
FIG. 2 is a simplified equivalent circuit according to the invention used for calculation of the recovering voltage and capacitor values.
Figure 3:
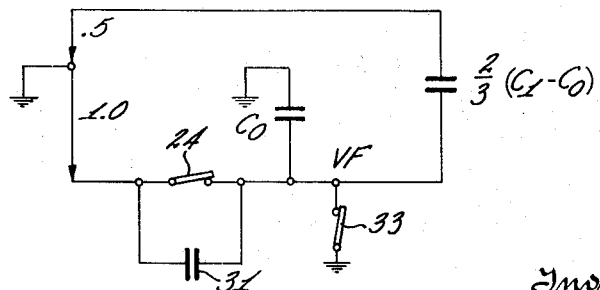
FIG. 3 is a further simplification of the equivalent circuit of FIG. 2.

With breakers 24 and 30 open, the equivalent circuit for calculating the recovery voltage, designate $V_F$, for line 14 is shown in FIG. 2. The capacitors 27, 29, 31 in each phase line are not a usual part of the system, but are added in accordance with the present invention and may be ignored for the present. In FIG. 2, voltages active in the circuit are shown at the left as .5 and 1.0 units of value with arrows designating sense or direction of flow. There would be some variations from these values in normal system operation, but this is not important here. From the circuit diagram in FIG. 3, the voltage $V_F$ is zero when $C =$ the value of capacitor $31 =$ $$\frac{1}{2}\frac{2}{3}(C_1 - C_0) = \frac{1}{3}(C_1 - C_0)$$

Clearly, for this unique and specific value of capacitor 31 (where C is the value of capacitor 31), there is no voltage $V_F$ on the faulted phase to cause the arc to persist. Thus, capacitor 31 makes it just as easy for a single line to ground fault to be cleared as it is for a three phase to be cleared.

Without the addition of the capacitor 31, the voltage $V_F$ is:

$$V_F = \frac{\frac{C_1}{C_0} - 1}{2\frac{C_1}{C_0} + 1}$$

In a typical case, $$\frac{C_1}{C_0} = 1.6$$

Thus, typically, $$V_F = \frac{1.6 - 1}{3.2 + 1} = \frac{.6}{4.2} = .143 \text{ per unit}$$

Without capacitor 31, it is more difficult for the fault to clear against this recovery voltage than against the zero voltage achieved with the addition of capacitor 31.

It is to be understood that in the drawing and in the formulae described herein, the designated $C_0$, $C_1 - C_0$, and C represent values for each individual phase line which is being considered. These designations do not represent sums or totals for the three lines in the system.

There is one complication associated with the occurrence of a three phase fault in a system employing capacitors across the breakers. With breakers 20, 22 and 24 all opened, there is now capacitance coupling to cause arc persistance for three phase faults. Provision must be made in relaying for the capacitors 27, 29 and 31 to be switched out first in case of three phase or double line to ground faults, but to be left in, in case of single line to ground faults. Accordingly, means are provided for this purpose and comprise the switches 34, 36 and 38 and suitable relay means 40, 42 and 44, respectively, for operating these switches. The interruption duty on switches needed to switch out the capacitors is zero in this case since the capacitors are always short circuited until the breakers interrupt.

The capacitors 27, 29, 31 are needed only at one end of the transmission line system. If for some reason capacitors are preferred at both ends, then the same degree of effectiveness could be achieved by placing capacitance of half the value discussed above at each end.

For the case where the breakers of two phases open (for example, breakers 20 and 22), a critical value can be found for the circuit of line 14 which is $$C = \frac{2}{3}(C_1 - C_0)$$

In the interests of simplicity and reliability, it is generally preferable to switch all three phases in the case of a double line to ground fault.

As an additional benefit to be derived from capacitors in parallel with breakers as disclosed here, closing transients will be markedly reduced if these same capacitors are always pre-inserted before the breakers close. These capacitors might well replace resistors which are often preinserted to reduce transient voltages upon energizing transmission lines.

The embodiments of the invention in which an exclusive property or privilege is claimed are defined as follows:

1. In a multiphase electrical transmission system having a plurality of single phase lines,
   a separate circuit interrupter in series with each line,
   a separate impedance means in circuit with each circuit interrupter,
   means for opening and closing each interrupter independently in response to a fault on its phase line,
   and means for disconnecting all impedance means before opening any of said interrupters when a fault occurs on all lines simultaneously.

2. A system according to claim 1 wherein each of said separate impedance means comprises a capacitor.

3. A system according to claim 2 wherein said plurality of single phase lines is three.

References Cited

UNITED STATES PATENTS 3,366,837  1/1968  Mester _____ 317—20 X
3,382,411  5/1968  Field _____ 317—24 X LEE T. HIX, Primary Examiner G. GOLDBERG, Assistant Examiner U.S. Cl. X.R.

317—24, 27, 60